July 15, 1952      P. C. PAPE      2,603,030
BAIT HOLDER CAGE
Filed April 19, 1950
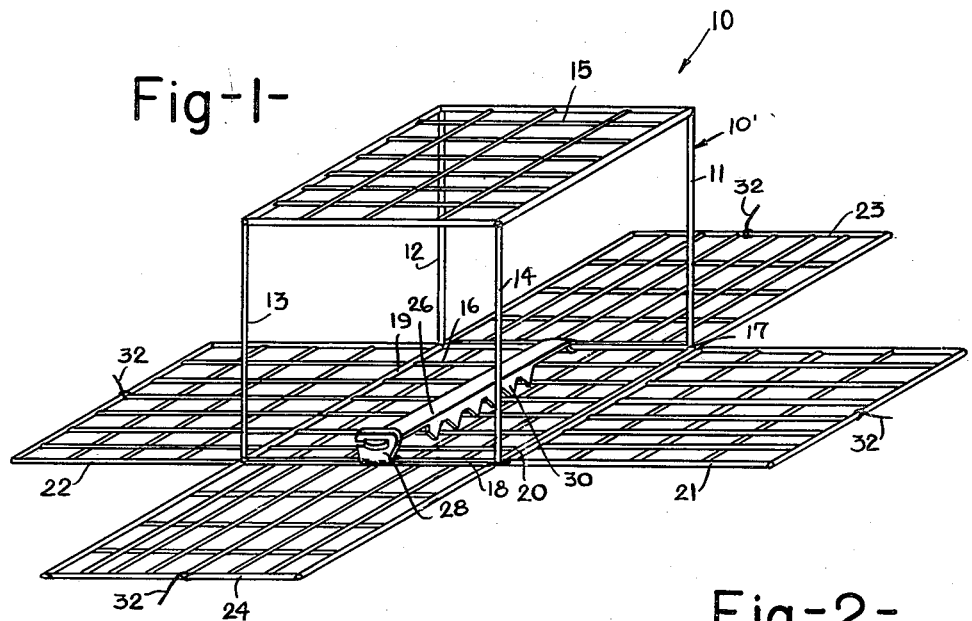
Fig-1-
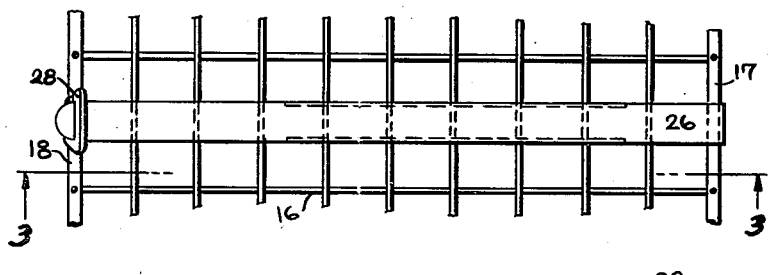
Fig-2-
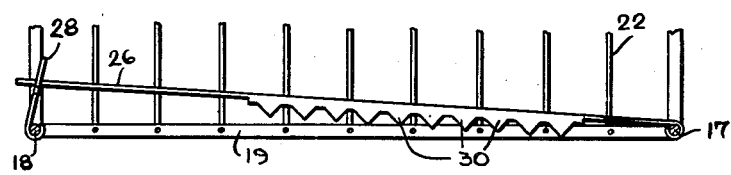
Fig-3-
Fig-4-
INVENTOR.
PASQUALE C. PAPE
BY
ATTORNEYS Patented July 15, 1952

2,603,030

UNITED STATES PATENT OFFICE 2,603,030

BAIT HOLDER CAGE

Pasquale C. Pape, Bronx, N. Y.

Application April 19, 1950, Serial No. 156,850

3 Claims. (Cl. 43—100)

This invention relates to a bait holder cage, and more particularly to a crab cage and the like having easily operable sides and provided with easily operable, serrated means for firmly holding the bait against the bottom of said cage to direct or attract the crabs, lobsters, and the like into the cage without removal or loss of the bait.

The catching of crabs, lobsters and other type of crustaceans affords pleasure to persons interested in catching the same and in many instances provides a fair source of income. Various means have been devised to entrap or catch such crabs or lobsters and the like. In some cases, hand nets are used, in other cases ordinary cages. One of the problems of catching crabs and the like, is the lack of a suitable crab cage which will retain the bait in the bottom of the cage in such a manner that it cannot be carried away by the crustacean.

With the above in view, it is an object of my invention to provide a crab cage having easily movable upright walls and compact, easily operable means in the cage for rigidly holding bait in the bottom of the cage.

Another object of the present invention is to provide a crab cage with outwardly swingable upright walls and having a floor with easily movable clamping means for holding bait against the floor of the cage, which bait can be easily replaced at random by the user of the cage.

A more specific object of my invention is to provide a crab catching cage, preferably of metal grill or framework, having upright easily openable walls and a swingable serrated holding member disposed at the bottom of the cage for retaining bait between the same and the floor of the cage, and locking means for said holding member in fixed or closed position.

Other objects and features of the present invention will become apparent from the hereinafter detailed description taken in conjunction with the accompanying drawing, in which:

Fig. 1 represents a perspective view of a preferred embodiment of my invention;

Fig. 2 is a partial, plan view of a portion of the embodiment shown in Fig. 1;

Fig. 3 is an end view taken on line 3—3 of Fig. 2; and,

Fig. 4 is a detail, end view of a portion of Fig. 1.

Referring now to the drawings in which similar reference characters denote like parts throughout, it will be noted that I provide a cage 10 comprising preferably a grill or framework 10' having uprights 11, 12, 13 and 14 with a top and bottom grill work 15 and 16, respectively. Said framework is rigid in construction, and the top and bottom, 15 and 16, are rigidly fixed to said framework. Said framework, furthermore, contains at bottom 16, crossbar members 17, 18, 19 and 20. Connected to the marginal edges of the bottom 16, of said framework, are opposed side walls 21 and 22, respectively, and front and rear walls 23 and 24, respectively. Each of said walls is made of wire mesh or of any type of grill work characteristic of crab cages. Said walls 21, 22, 23 and 24 are connected to the floor or bottom 16 in such a manner either by loose wiring or by loose hinge connections so as to permit easy, outward swinging of said walls from the framework. Each of said walls is provided with suitable string 32 or other fastening member whereby the walls may be brought upwardly into vertical position against the framework so as to enclose the same and permit the operator to pull the cage out of the water, as desired.

In order to draw the crustacean into the framework of said cage, a piece of bait, such as meat, is fixed to the floor 16 of the cage by means of a serrated, clamp member 26 which is hingedly connected at one end to the cross bar member 17 at the bottom of framework 10, while the other end is adapted to extend slightly outward of the upright wall 24 and effect connection with an adjustable locking member 28, which is hingedly connected in any suitable manner to member 18. Said member 26, it will be noted, is channeled and provided preferably with multiple, spaced serrations 30, which are disposed in parallel vertical planes. Said member, furthermore, is slightly flexible so as to permit bending of the same and pressing the bait against the floor of the cage thereby preventing removal of the bait by the crustacean when the cage is open and lying on the bottom of the water. The locking member 28, as shown, can be swung toward the interior of the cage or swung outwardly of the member 18 so as to permit engagement or disengagement of said bait pressing member 26.

From the foregoing description taken in conjunction with the accompanying drawing, it will be noted that I provide a crab cage having effective means for retaining bait in said cage without any fear of removal or loss of said bait. It will be also noted that according to my invention, the serrations 30 of the holding member 26 are such that they dig into the bait and at the same time force the bait against the floor 16 of the cage. The upright walls can be readily raised or lowered depending upon the desires of the crab catcher by proper manipulation of strings 32 connected to each of said upright walls.

While a preferred embodiment of my invention has been disclosed and illustrated, it is to be noted that various modifications as to form, structure, arrangement of parts and use of materials may be made without departing from the spirit and scope of the invention as claimed.

I claim:

1. In a crab catching trap and the like having a rigid framework, a top grilled member forming the roof thereof, grills forming front and rear and side walls respectively each hinged to the bottom of the framework at the floor portion thereof and adapted to be swung outwardly of the framework, the improvement comprising a grilled member fixed to the bottom of the framework forming the floor thereof, a channeled multi-serrated member hingedly connected at one end to and extending from one end of the framework at the floor thereof to beyond the opposite end of the framework, the serrations of said member extending downwardly against the floor thereof, and an adjustable, swingable, notched member mounted on the bottom of the framework at the end opposite the hinged end of the multi-serrated member for holding the free end of said adjustable member, said adjustable member forming a relatively wide but flexible clamp with the floor to retain and hold bait against said floor as a lure for crustaceans and the like.

2. In a crab catching cage structure and the like having a framework with a fixed metal grilled top, a pair of opposed front and rear, outwardly swingable metal grilled walls, and a pair of outwardly swingable grilled side walls, said walls being hingedly connected to the bottom of said framework, the improvements comprising the bottom floor member of said framework, a channeled multi-serrated holding member hingedly connected at one of its ends to the bottom floor member of said framework and adapted to be raised upwardly with respect to the floor of said framework and hold crab bait therebetween, said serrated member being adapted to be relatively flat with respect to the bottom wall, and locking means for said holding member.

3. In a crab catching cage structure and the like having a framework with a fixed metal grilled top, a pair of opposed front and rear, outwardly swingable metal grilled walls, and a pair of outwardly swingable grilled side walls, said walls being hingedly connected to the bottom of said framework, the improvements comprising, the bottom floor member of said framework, a channeled multi-serrated holding member hingedly connected at one end to the bottom of said framework and adapted to be raised upwardly with respect to the floor member of said framework and hold relatively large quantities of crab bait between the same and the bottom wall or floor member and notched, outwardly swingable locking means at the bottom floor member of the framework adjacent one end of the floor member for holding said holding member against said floor.

PASQUALE C. PAPE.

REFERENCES CITED

The following references are of record in the file of this patent:

UNITED STATES PATENTS

| Number | Name | Date |
|---|---|---|
| 99,713 | Sabins | Feb. 8, 1870 |
| 113,292 | Hammond | Apr. 4, 1871 |
| 255,922 | Bradford | Apr. 4, 1882 |
| 1,531,300 | Merle | Mar. 31, 1925 |